United States Patent
Adams et al.

(10) Patent No.: US 9,643,273 B2
(45) Date of Patent: May 9, 2017

(54) SYSTEMS AND METHODS FOR CONFIGURING A CUTTING OR WELDING DELIVERY DEVICE

(71) Applicant: Hypertherm, Inc., Hanover, NH (US)

(72) Inventors: Richard Adams, Norwich, VT (US); Steve Bertken, Lees Summit, MO (US)

(73) Assignee: Hypertherm, Inc., Hanover, NH (US)

( * ) Notice: Subject to any disclaimer, the term of this patent is extended or adjusted under 35 U.S.C. 154(b) by 733 days.

(21) Appl. No.: 14/053,078

(22) Filed: Oct. 14, 2013

(65) Prior Publication Data

US 2015/0105898 A1    Apr. 16, 2015

(51) Int. Cl.
*G05B 19/414*   (2006.01)
*B23K 9/013*    (2006.01)
(Continued)

(52) U.S. Cl.
CPC ............. *B23K 9/013* (2013.01); *B23K 10/00* (2013.01); *B23K 10/006* (2013.01); *B23K 26/02* (2013.01);
(Continued)

(58) Field of Classification Search
CPC .... B23K 9/013; B23K 26/02; B23K 37/0235; B23K 26/38; B23K 37/0461;
(Continued)

(56) References Cited

U.S. PATENT DOCUMENTS 2,985,050 A  5/1961  Schwacha
3,018,360 A  1/1962  Engel
(Continued)

FOREIGN PATENT DOCUMENTS

CA   2439213       10/2006
EP   0508482 A2   10/1992
(Continued)

OTHER PUBLICATIONS

Invitation to Pay Additional Fees with partial International Search Report for PCT/US2014/051106 dated Oct. 30, 2014, 6 pages.
(Continued)

*Primary Examiner* — Charles Kasenge
(74) *Attorney, Agent, or Firm* — Proskauer Rose LLP

(57) ABSTRACT

A system is provided for configuring a delivery device of a cutting or welding apparatus. The system includes a determination module and a mobile computing device. The determination module is configured to determine at least one desired component of the delivery device or a value for at least one operating parameter of the cutting or welding apparatus. The mobile computing device includes a receiver, a reader and a processor. The receiver is configured to receive information from the determination module including at least one of i) identification of the desired component or ii) the value of the operating parameter. The reader is configured to read an element associated with a selected component, where the element provides indicia of at least one characteristic of the selected component. The processor is configure to approve the selected component for assembly into the delivery device.

29 Claims, 6 Drawing Sheets

(51) Int. Cl.
*B23K 10/00* (2006.01)
*B23K 37/02* (2006.01)
*B23K 37/04* (2006.01)
*B23K 26/02* (2014.01)
*B23K 26/08* (2014.01)
*B23K 26/38* (2014.01)
*B23K 103/04* (2006.01)

(52) U.S. Cl.
CPC .......... *B23K 26/0876* (2013.01); *B23K 26/38* (2013.01); *B23K 37/0235* (2013.01); *B23K 37/0408* (2013.01); *B23K 37/0461* (2013.01); *B23K 2203/04* (2013.01); *G05B 2219/42135* (2013.01); *G05B 2219/45135* (2013.01); *G05B 2219/49304* (2013.01); *G05B 2219/50255* (2013.01)

(58) Field of Classification Search
CPC  B23K 26/0876; B23K 10/00; B23K 37/0408; B23K 10/006; B23K 2203/04; G05B 2219/50255; G05B 2219/42135; G05B 2219/49304; G05B 2219/45135
See application file for complete search history.

(56) References Cited

U.S. PATENT DOCUMENTS

| | | | |
|---|---|---|---|
| 3,010,012 A | 11/1964 | Tuthill | |
| 3,518,401 A | 6/1970 | Mathews | |
| 3,602,683 A | 8/1971 | Hishida et al. | |
| 4,125,754 A | 11/1978 | Wasserman et al. | |
| 4,497,029 A | 1/1985 | Kiyokawa | |
| 4,519,835 A | 5/1985 | Gauvin et al. | |
| 4,588,880 A | 5/1986 | Hesser | |
| 4,733,052 A | 3/1988 | Nilsson et al. | |
| 4,742,470 A | 5/1988 | Juengel | |
| 5,018,670 A | 5/1991 | Chalmers | |
| 5,050,106 A | 9/1991 | Yamamoto et al. | |
| 5,086,655 A | 2/1992 | Fredericks et al. | |
| 5,099,226 A | 3/1992 | Andrews | |
| 5,248,867 A | 9/1993 | Ohba et al. | |
| 5,309,683 A | 5/1994 | Hockett | |
| 5,357,076 A | 10/1994 | Blankenship | |
| 5,381,487 A | 1/1995 | Shamos | |
| 5,388,965 A | 2/1995 | Fehn | |
| 5,390,964 A | 2/1995 | Gray, Jr. | |
| 5,400,389 A | 3/1995 | Niiyama et al. | |
| 5,440,477 A | 8/1995 | Rohrberg et al. | |
| 5,500,512 A | 3/1996 | Goldblatt | |
| 5,556,562 A | 9/1996 | Sorenson | |
| 5,653,264 A | 8/1997 | Atkinson | |
| 5,717,187 A | 2/1998 | Rogozinski et al. | |
| 5,860,849 A | 1/1999 | Miller | |
| 5,994,663 A | 11/1999 | Lu | |
| 6,047,579 A | 4/2000 | Schmitz | |
| 6,130,407 A | 10/2000 | Villafuerte | |
| 6,133,542 A | 10/2000 | Dvorak et al. | |
| 6,201,207 B1 | 3/2001 | Maruyama et al. | |
| 6,248,975 B1* | 6/2001 | Lanouette | B23K 9/095 219/130.21 |
| 6,259,059 B1 | 7/2001 | Hsu | |
| 6,267,291 B1 | 7/2001 | Blankenship et al. | |
| 6,326,583 B1 | 12/2001 | Hardwick et al. | |
| 6,409,476 B2 | 6/2002 | Mills | |
| 6,479,793 B1 | 11/2002 | Wittmann et al. | |
| 6,510,984 B2 | 1/2003 | Blankenship et al. | |
| 6,539,813 B1 | 4/2003 | Horiuchi et al. | |
| 6,563,085 B2 | 5/2003 | Lanouette et al. | |
| 6,657,162 B1 | 12/2003 | Jung et al. | |
| 6,659,098 B1* | 12/2003 | Sekiya | B23D 59/002 125/13.01 |
| 6,693,252 B2 | 2/2004 | Zhang et al. | |
| 6,707,304 B2 | 3/2004 | Buhler et al. | |
| 6,717,096 B2 | 4/2004 | Hewett et al. | |
| 6,729,468 B1* | 5/2004 | Dobmeier | B23D 59/00 206/303 |
| 6,772,040 B1 | 8/2004 | Picard et al. | |
| 6,781,085 B2 | 8/2004 | Ulrich et al. | |
| 6,836,698 B2* | 12/2004 | Fujishima | G05B 19/4065 700/108 |
| 6,852,949 B2* | 2/2005 | Lanouette | B23K 9/095 219/130.21 |
| 6,933,462 B2* | 8/2005 | Iriyama | H05H 1/26 219/121.48 |
| 6,960,737 B2 | 11/2005 | Tatham | |
| 6,980,704 B2 | 12/2005 | Kia et al. | |
| 6,992,262 B2 | 1/2006 | Matus et al. | |
| 7,030,337 B2 | 4/2006 | Baker et al. | |
| 7,032,814 B2 | 4/2006 | Blankenship | |
| 7,115,833 B2 | 10/2006 | Higgins et al. | |
| 7,186,944 B2 | 3/2007 | Matus et al. | |
| 7,307,533 B2 | 12/2007 | Ishii | |
| 7,358,458 B2 | 4/2008 | Daniel | |
| 7,375,302 B2 | 5/2008 | Twarog et al. | |
| 7,411,154 B2 | 8/2008 | Fosbinder et al. | |
| 7,645,960 B2 | 1/2010 | Stava | |
| 7,671,294 B2 | 3/2010 | Belashchenko et al. | |
| 7,680,625 B2 | 3/2010 | Trowbridge et al. | |
| 7,755,484 B2 | 7/2010 | Cullen et al. | |
| 7,843,334 B2 | 11/2010 | Kumagai et al. | |
| 8,035,487 B2 | 10/2011 | Malackowski | |
| 8,085,150 B2 | 12/2011 | Oberle | |
| 8,141,240 B2* | 3/2012 | Hiew | H01L 21/561 29/412 |
| 8,203,095 B2 | 6/2012 | Storm et al. | |
| 8,204,618 B2 | 6/2012 | Young, Jr. et al. | |
| 8,242,907 B2 | 8/2012 | Butler et al. | |
| 8,263,896 B2 | 9/2012 | Schneider | |
| 8,272,794 B2 | 9/2012 | Silchenstedt et al. | |
| 8,278,588 B2 | 10/2012 | Salsich et al. | |
| 8,316,742 B2* | 11/2012 | Craig | B23B 51/00 82/1.11 |
| 8,373,084 B2 | 2/2013 | Salsich | |
| 8,376,671 B2 | 2/2013 | Kaneko | |
| 8,395,076 B2 | 3/2013 | Matus | |
| 8,431,862 B2 | 4/2013 | Kachline | |
| 8,620,738 B2 | 12/2013 | Fordyce, III et al. | |
| 8,658,941 B2* | 2/2014 | Albrecht | B23K 9/0953 219/130.1 |
| 8,686,318 B2* | 4/2014 | Albrecht | B23K 9/10 219/130.01 |
| 8,748,776 B2 | 6/2014 | Albrecht et al. | |
| 8,759,715 B2 | 6/2014 | Narayanan et al. | |
| 8,766,132 B2 | 7/2014 | Blankenship et al. | |
| 8,859,828 B2 | 10/2014 | Liu et al. | |
| 8,859,928 B2 | 10/2014 | Sommerfeld | |
| 9,031,683 B2 | 5/2015 | Elfstrom et al. | |
| 9,129,330 B2* | 9/2015 | Albrecht | G06Q 30/0633 |
| 9,229,436 B2* | 1/2016 | Stumpfl | B23K 9/125 |
| 9,233,480 B2* | 1/2016 | Nagai | B26D 5/30 |
| 2002/0117484 A1 | 8/2002 | Jones et al. | |
| 2003/0025598 A1 | 2/2003 | Wolf et al. | |
| 2003/0094487 A1 | 5/2003 | Blankenship et al. | |
| 2003/0148709 A1 | 8/2003 | Anand et al. | |
| 2004/0004064 A1* | 1/2004 | Lanouette | B23K 9/095 219/130.21 |
| 2004/0031776 A1 | 2/2004 | Gevelber et al. | |
| 2004/0106101 A1 | 6/2004 | Evans | |
| 2004/0173583 A1* | 9/2004 | Iriyama | H05H 1/26 219/121.53 |
| 2004/0193307 A1* | 9/2004 | Fujishima | G05B 19/4065 700/177 |
| 2005/0045599 A1 | 3/2005 | Matus | |
| 2005/0109738 A1 | 5/2005 | Hewett et al. | |
| 2005/0145688 A1 | 7/2005 | Milenkovic et al. | |
| 2005/0173390 A1* | 8/2005 | Lanouette | B23K 9/095 219/130.21 |
| 2006/0006154 A1 | 1/2006 | Koike | |
| 2006/0070986 A1 | 4/2006 | Ihde et al. | |
| 2006/0163228 A1 | 7/2006 | Daniel | |
| 2006/0163230 A1 | 7/2006 | Kaufman | |
| 2006/0201923 A1 | 9/2006 | Hutchison | |

(56) References Cited

U.S. PATENT DOCUMENTS

| | | |
|---|---|---|
| 2006/0289406 A1 | 12/2006 | Helenius et al. |
| 2007/0080149 A1 | 4/2007 | Albrecht et al. |
| 2007/0080151 A1 | 4/2007 | Albrecht et al. |
| 2007/0080152 A1 | 4/2007 | Albrecht et al. |
| 2007/0080153 A1* | 4/2007 | Albrecht .................. B23K 9/10 219/130.01 |
| 2007/0294608 A1 | 12/2007 | Winterhalter et al. |
| 2008/0001752 A1 | 1/2008 | Bruns |
| 2008/0011821 A1 | 1/2008 | Ellender et al. |
| 2008/0061049 A1* | 3/2008 | Albrecht .............. B23K 9/0953 219/137 R |
| 2008/0066596 A1 | 3/2008 | Yamaguchi |
| 2008/0093476 A1 | 4/2008 | Johnson et al. |
| 2008/0149608 A1 | 6/2008 | Albecht |
| 2008/0149686 A1 | 6/2008 | Daniel et al. |
| 2008/0156783 A1 | 7/2008 | Vanden Heuvel |
| 2008/0223952 A1 | 9/2008 | Wernli et al. |
| 2008/0257874 A1 | 10/2008 | Kaufman et al. |
| 2008/0308641 A1 | 12/2008 | Finn |
| 2009/0008370 A1 | 1/2009 | Salsich et al. |
| 2009/0057286 A1 | 3/2009 | Ihara et al. |
| 2009/0065489 A1 | 3/2009 | Duffy |
| 2009/0107960 A1 | 4/2009 | Hampton |
| 2009/0152255 A1 | 6/2009 | Ma |
| 2009/0159572 A1 | 6/2009 | Salsich |
| 2009/0159575 A1 | 6/2009 | Salisich |
| 2009/0163130 A1 | 6/2009 | Zambergs |
| 2009/0175694 A1* | 7/2009 | Craig ...................... B23B 51/00 407/37 |
| 2009/0184098 A1 | 7/2009 | Daniel et al. |
| 2009/0212027 A1 | 8/2009 | Borowy et al. |
| 2009/0222804 A1 | 9/2009 | Kaufman |
| 2009/0230097 A1 | 9/2009 | Liebold et al. |
| 2009/0240368 A1* | 9/2009 | Young, Jr. .............. B23K 31/10 700/166 |
| 2009/0288532 A1 | 11/2009 | Hashish |
| 2010/0084381 A1 | 4/2010 | Indraczek et al. |
| 2010/0155377 A1 | 6/2010 | Lindsay et al. |
| 2010/0324868 A1 | 12/2010 | Russell et al. |
| 2011/0000893 A1 | 1/2011 | Blankenship et al. |
| 2011/0029385 A1 | 2/2011 | Engel et al. |
| 2011/0114616 A1 | 5/2011 | Albrecht |
| 2011/0163857 A1 | 7/2011 | August et al. |
| 2011/0220630 A1 | 9/2011 | Speilman et al. |
| 2011/0294401 A1 | 12/2011 | Habermann et al. |
| 2012/0021676 A1 | 1/2012 | Schubert et al. |
| 2012/0138583 A1 | 6/2012 | Winn et al. |
| 2012/0139692 A1* | 6/2012 | Neubauer ................ B25F 5/00 340/5.2 |
| 2012/0234803 A1 | 9/2012 | Liu et al. |
| 2012/0241428 A1 | 9/2012 | Kowaleski |
| 2012/0247293 A1* | 10/2012 | Nagai ................... B26F 1/3806 83/76.3 |
| 2013/0068732 A1 | 3/2013 | Watson et al. |
| 2013/0179241 A1 | 7/2013 | Liu |
| 2013/0210319 A1 | 8/2013 | Gramling et al. |
| 2013/0253728 A1* | 9/2013 | Stumpfl ................ B23K 9/125 700/301 |
| 2013/0263420 A1 | 10/2013 | Shipulski |
| 2013/0264317 A1 | 10/2013 | Hoffa et al. |
| 2013/0264320 A1 | 10/2013 | Shipulski et al. |
| 2014/0335761 A1 | 11/2014 | Chou et al. |

FOREIGN PATENT DOCUMENTS

| | | |
|---|---|---|
| EP | 1 065 620 | 1/2001 |
| EP | 1117279 A1 | 7/2001 |
| EP | 1288016 | 3/2003 |
| EP | 1516688 A1 | 3/2005 |
| EP | 1522371 A1 | 4/2005 |
| JP | S61-63368 | 4/1986 |
| JP | H05154732 A | 6/1993 |
| JP | H11285831 A | 10/1999 |
| JP | 2003025176 A | 1/2003 |
| JP | 2003048134 A | 2/2003 |
| JP | 2009252085 A | 10/2009 |
| JP | 2012048287 A | 3/2012 |
| JP | 2012079221 A | 4/2012 |
| WO | 2008144785 A1 | 12/2008 |
| WO | 2009142941 A2 | 11/2009 |
| WO | 2010142858 A1 | 12/2010 |
| WO | 2013000700 A1 | 1/2013 |
| WO | 2013151602 A2 | 10/2013 |
| WO | 2013151886 A2 | 10/2013 |

OTHER PUBLICATIONS

Torchmate Arc Voltage Torch Height Control—Operation Manual, Applied Robotics, Inc., Oct. 2005, pp. 1-19.

International Search Report for International Application No. PCT/US2013/021364 dated Jan. 14, 2013 4 pages.

International Search Report for International Application No. PCT/US2013/034572 dated Mar. 29, 2013 4 pages.

Examination Report for corresponding Australian Patent Application No. 2013243978, dated Nov. 17, 2015, 4 pages.

TRUMPF Press Release, New RFID lens provides LensLine sensor system with improved condition checking capabilities, online press release available at http://www.trumpf.com/nc/en/press/press-releases/press-release/rec-uid/266044.html, Aug. 12, 2013. (4 pages).

* cited by examiner

| Required Operating Parameters | |
|---|---|
| Material Type | Mild Steel |
| Specific Material | None |
| Process Current | 200 A |
| # of Cuts | 50 |
| Duration/cut | 25s |

400

SYSTEMS AND METHODS FOR CONFIGURING A CUTTING OR WELDING DELIVERY DEVICE

FIELD OF THE INVENTION

The present invention relates generally to configuring a delivery device of a cutting or welding system, and more specifically, to selecting one or more suitable components for assembly into the delivery device.

BACKGROUND OF THE INVENTION

Delivery devices, such as plasma arc torches and water jet torches, are widely used in the heating, cutting, welding, gouging and marking of materials. For example, a plasma arc torch generally includes a torch body, an electrode mounted within the body, passages for cooling fluid, cut gas, and shield gas, a swirl ring for controlling the fluid flow patterns, a nozzle with a central exit orifice, and various electrical connections. A shield can be provided around the nozzle to protect the nozzle and support a shield gas flow to the area proximate the plasma arc. Gases applied to the plasma arc torch can be non-reactive (e.g., argon or nitrogen) or reactive (e.g., oxygen or air).

A delivery device (e.g., a torch) can be included in a cutting or welding system configured to automatically control the operation of the delivery device. FIG. 1 shows a known automated plasma arc torch system 90, which is shown to include a plasma arc torch 100, an associated power supply/gas supply 110, a remote high-frequency (RHF) console 120, a positioning apparatus 130, a cutting table 140, a torch height control 150 and a digital signal processor 160 (e.g., an associated computer numeric controller (CNC)). In operation, a user can place a workpiece on the cutting table 140 and mount the torch 100 on the positioning apparatus 130, which provides relative motion between the tip of the torch 100 and the workpiece to direct the plasma arc along a processing path. The user can provide a start command to the digital signal processor 160 to initiate the cutting process. The digital signal processor 160 accurately directs motion of the torch 100 and/or the cutting table 140 to enable the workpiece to be cut to a desired pattern. The digital signal processor 160 can be in communication with the positioning apparatus 130, which uses signals from the digital signal processor 160 to direct the torch 100 along the desired cutting path. Position information is returned from the positioning apparatus 130 to the digital signal processor 160 to allow the digital signal processor 160 to operate interactively with the positioning apparatus 130 to obtain an accurate cut path. In general, the digital signal processor 160 can be configured to operate with plasma arc, laser, oxy fuel, and/or water jet technologies.

In general, numerous components are needed to configure a delivery device (e.g., torch 100) within the cutting or welding system in advance of a desired operation. For example, each desired operation often requires one or more specific components to be installed into the delivery device, where the components can satisfy certain operation requirements or withstand certain operating conditions. These specific components can be difficult to locate and differentiate from others with similar features, especially when the components are stored in a large warehouse.

SUMMARY OF THE INVENTION

The present invention facilitates quick installation of components required for a delivery system to complete a desired cutting or welding operation, which can encourage operators to try more processes or attempt operations with new materials. In addition, the present invention can reduce false starts or other operation errors that reduce productivity. In some embodiments, one or more components for executing a desired operation can be recommended to an operator based on information collected about the delivery device or related system usable to execute the operation. Such information can include, for example, computer generated job requirements and/or usage statistics and process requirements reported by a CNC or collected from the delivery device. In certain embodiments, the information is presented to an operator and can be used to automatically verify operator selection of one or more components. In some embodiments, in response to the operator's indication of a desired operation, a shopping list of components can be presented to the operator via, for example, a mobile device, a printout, a vending machine, a bin or shelf or an automated selection device. The shopping list can include parts and/or materials needed to complete an operation. Exemplary parts and materials include consumables, machine elements (e.g., a particular torch or other configurable parts), and characteristics of materials to be cut (e.g., dimensions and quantities). In addition to parts and materials, the shopping list can also include recommendations of certain tasks for execution by an operator, such as maintenance or verification steps. Based on the shopping list, the operator can gather the recommended components and configure the delivery device prior to starting the operation. In some embodiments, a component selected by an operator may be associated with an electronic verification tag, such as a radio-frequency identification (RFID) tag, which can be scanned prior to installation to ensure that the selected component matches a recommended component on the shopping list. In some embodiments, the life expectancy of a selected component, including life remaining in the component, can be calculated and presented to the operator so that the operator can determine whether the selected component has sufficient life remaining to complete a desired operation. Hence, old components can be safely reused, thereby reducing waste.

In one aspect, a computer-implemented method is provided for configuring a cutting or welding system. The method includes receiving, by a portable device, at least one of i) identification of at least one desired component for a delivery device of the cutting or welding system, or ii) at least one operation requirement of the cutting or welding system. The method includes reading, by the portable device, a tag associated with a selected component. The tag provides indicia of at least one characteristic of the selected component. The method further includes verifying, by the portable device, the suitability of the selected component for assembly into the delivery device by determining if the indicia matches the identification of the desired component or meets the operation requirement.

In some embodiments, the method further includes receiving, by a determination module, instruction code for operating the delivery device, identifying, by the determination module, the operation requirement and the desired component to implement the instruction code, and transmitting, by the determination module, to the portable device at least one of the identification of the desired component or the operation requirement. The instruction code can include data related to the shape of at least one part to be cut from a workpiece by the delivery device.

In some embodiments, the method further includes recommending, by the portable device, a plurality of selected components for assembly into the delivery device. Each of the plurality of selected components corresponds to at least one of i) a plurality of identifications of desired components for the delivery device or ii) a plurality of operation requirements of the cutting or welding system.

In another aspect, a system is provided for configuring a delivery device of a cutting or welding apparatus. The system includes a determination module, a receiver, a reader and a processor. The determination module is adapted to determine at least one desired component of the delivery device or a value for at least one operating parameter of the cutting or welding apparatus. The receiver is configured to receive information from the determination module including at least one of i) identification of the desired component or ii) the value of the operating parameter. The reader is configured to read an element associated with a selected component, where the element provides indicia of at least one characteristic of the selected component. The processor is configured to approve the selected component for assembly into the delivery device if the indicia matches the identification of the desired component or satisfies the value for the at least one operating parameter. The reader can be at least one of a scanner or a camera.

In some embodiments, the reader is configured to read a plurality of elements associated with a plurality of selected components. The processor is configured to approve the plurality of selected components for assembly into the delivery device by determining if the plurality of selected components satisfy i) identification of a plurality of desired components corresponding to a cutting routine or ii) one or more operation requirements corresponding to the cutting routine.

In another aspect, a computer readable product is provided that is tangibly embodied on a non-transitory computer readable medium or a machine-readable storage device. The computer readable product is operable on a digital signal processor for a system to configure a delivery device of a cutting or welding apparatus. The computer readable product includes instructions operable to cause the digital signal processor to receive at least one of i) identification of at least one desired component for assembly into the delivery device or ii) at least one operation requirement of the cutting or welding apparatus. The computer readable product includes instructions operable to cause the digital signal processor to scan a tag associated with a selected component. The tag provides indicia of at least one characteristic of the selected component. The computer readable product includes instructions operable to cause the digital signal processor to verify the suitability of the selected component for assembly into the delivery device based on comparing the indicia with at least one of the identification of the desired component or the operation requirement.

In some embodiments, the computer readable product includes instructions operable to cause the digital signal processor to verify the suitability of a plurality of selected components for assembly into the delivery device corresponding to at least one of i) a plurality of identifications of desired components for the delivery device or ii) a plurality of operation requirements of the cutting or welding apparatus.

In another aspect, a computer-implemented method is provided for configuring a cutting or welding device. The method includes providing a component for the cutting or welding device, the component having a tag attached thereto that is readable and writable. The method also includes scanning, by a portable device, the tag to read data stored on the tag. The method further includes determining, based on the data stored on the tag, information representing at least one of past usage information of the component or life expectancy information of the component.

In some embodiments, the computer-implemented method further includes confirming, based on the usable life information, that the component has sufficient usable life remaining to complete a desired operation of the cutting or welding device. The component can be recommended for assembly into the cutting or welding device to perform the desired operation if the component is confirmed to have sufficient usable life remaining. In addition, data can be written to the tag of the component to update the data stored on the tag after the component is used to perform the desired operation.

In some embodiments, the data stored on the tag records at least one of the number of starts performed by the component, the current amperage corresponding to each start, and the cut time corresponding to each start.

In some embodiments, the portable device can present a percentage usage remaining for the component that is normalized with respect to the desired operation. In some embodiments, the portable device can present the life expectancy of the component via a graphical user interface of the portable device.

In other examples, any of the aspect above can include one or more of the following features. In some embodiments, the portable device comprises a mobile computing device. In some embodiments, the tag is a radio-frequency identification (RFID) tag, a bar code, a laser-readable marking, or a visual characteristic. The tag can be readable, or writable, or a combination thereof. In some embodiments, the delivery device comprises a plasma arc torch, a waterjet nozzle, a waterjet orifice, a laser nozzle, or a cutting head.

In some embodiments, the selected component comprises a consumable component. The consumable component can comprise one of an electrode, a nozzle, a shield, a swirl ring, a retaining cap or a replaceable torch body for a plasma arc system. The consumable component can be associated with a plasma arc, laser or waterjet cutting system. In some embodiments, the indicia of at least one characteristic of the selected component is at least one of an identification, a type, or a life expectancy of the selected component.

In some embodiments, identification of the desired component or the operation requirement is determined by a determination module based on a cutting routine supplied by a user.

It should also be understood that various aspects and embodiments of the invention can be combined in various ways. Based on the teachings of this specification, a person of ordinary skill in the art can readily determine how to combine these various embodiments. For example, in some embodiments, any of the aspects above can include one or more of the above features. One embodiment of the invention can provide all of the above features and advantages.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

Figure 1:
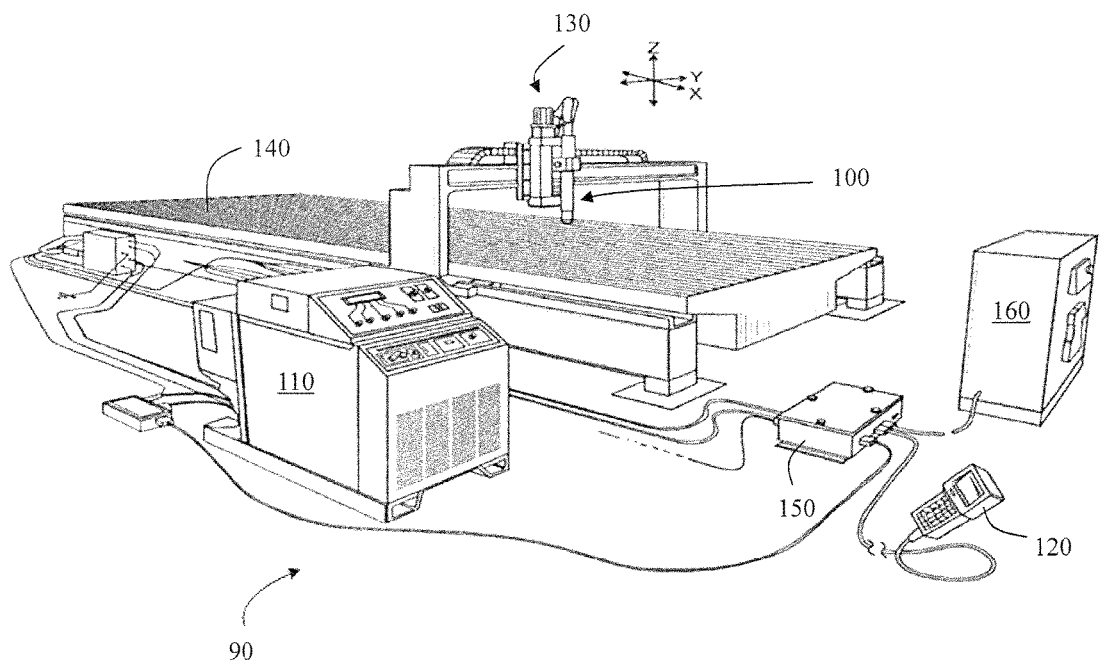
FIG. 1 illustrates a known automated plasma arc system.
Figure 2:
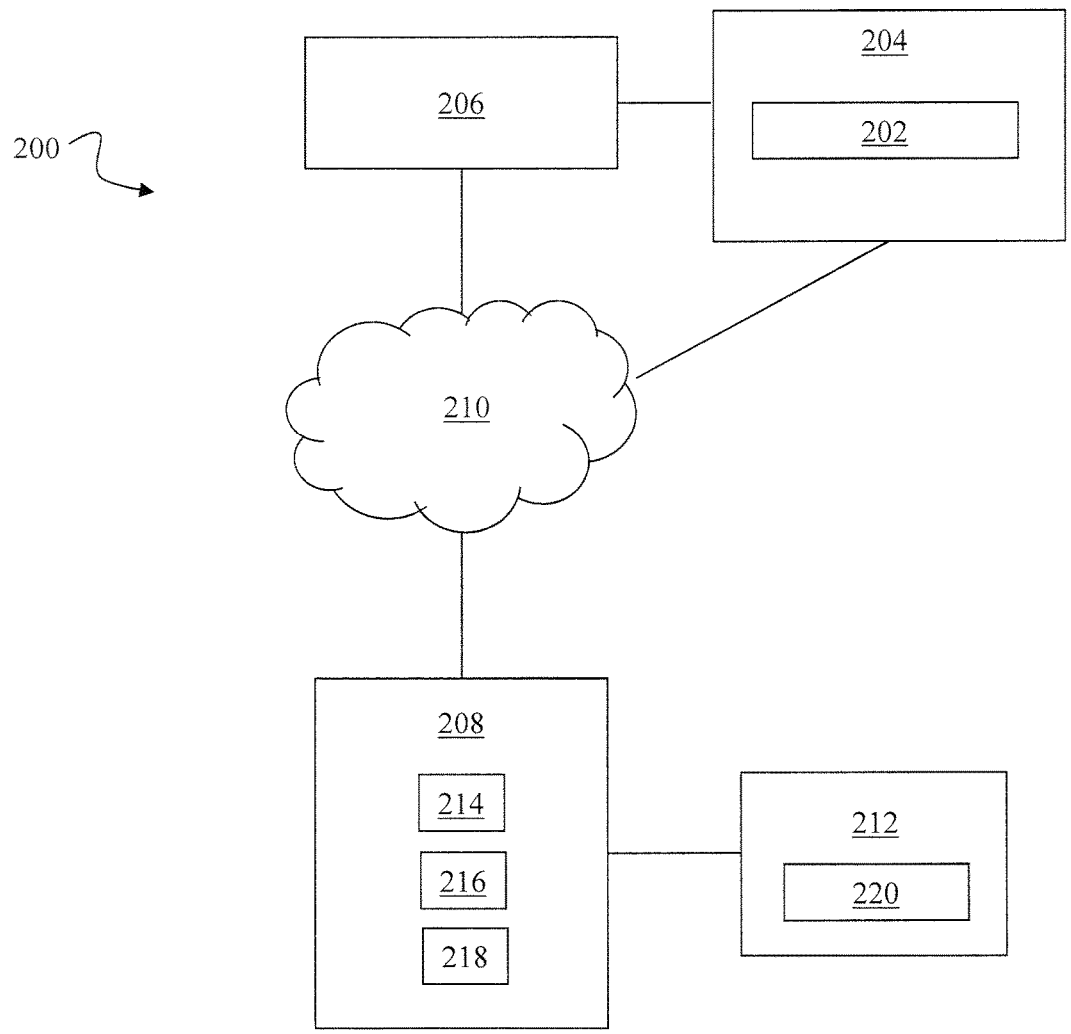
FIG. 2 shows an exemplary network environment.

FIG. 2 shows an exemplary network environment according to some embodiments of the present invention. The network environment 200 facilitates automated selection of components for configuring a delivery device 202 of a cutting or welding system/apparatus 204, such as the plasma arc torch 100 of the plasma arc torch system 90 of FIG. 1, thereby enabling the delivery device 202 to perform a desired cutting or welding operation. In other embodiments, the delivery device 202 can be a waterjet nozzle, a waterjet orifice, a laser nozzle, or a cutting head. As shown, the system 200 of FIG. 2 includes a determination module 206 configured to communicate with the cutting or welding system 204 and a computing device 208 via an IP network 210, such as a LAN, WAN, cellular network or the Internet. However, communication over the IP network 210 is not required in all embodiments. For example, in some embodiments, communications occur over network protocols other than Internet Protocol (IP), such as infrared transmission systems, Blue Tooth Networks or Personal Area Networks (PANs). Based on interaction with the determination module 206, the computing device 208 can communicate with a component 212 to determine whether the component 212 is suitable for configuration into the delivery device 202.

The determination module 206 can assist in the determination of at least one suitable component for assembly into the delivery device 202 and/or an appropriate operation requirement of the system 204 in order to carry out a desired cutting or welding operation. A suitable component can be a consumable component, such as an electrode, a nozzle, a shield, a swirl ring, a retaining cap or a replaceable torch body for a plasma arc torch of a plasma arc system. In other embodiments, the suitable component can be a consumable component associated with a laser or waterjet cutting system. An appropriate operating requirement can be a specific value or a range of values for an operating parameter of the system 204, such as specifications for current, gas flow/composition, workpiece thickness, workpiece material, etc.

In some embodiments, the determination module 206 determines a suitable component or operating requirement based on instruction code received from a user for achieving a desired operational goal. The instruction code can be, for example, data describing the shape of at least one part to be cut from a workpiece and number of cuts required. Using the received data, the determination module 206 can select mandatory and/or optional operating parameters that correspond to a process for achieving the goal. The determination module 206 can also automatically determine the desired values for these operating parameters or ask the user to specify these values. The determination module 206 can additionally identify a single component or a suite of components suitable for configuration into the delivery device 202 to achieve the operating parameter values. The determination module 206 can identify the appropriate components and/or operating parameters based on the systems and methods described in U.S. Pat. No. 8,204,618, which include systems and methods for automatically selecting operating parameters or components that correspond to a process and/or workpiece based on user input, such as data for the shape of at least one part to be cut from the workpiece. The '618 patent is herein incorporated by reference in its entirety. The determination module 206 can subsequently transmit to the computing device 208 at least one of the identification of the suitable components or the operation requirements (e.g., values of one or more operating parameters).

The determination module 206 can be a software-based module or include a combination of hardware or software. In some embodiments, the determination module 206 is a digital signal processor (e.g., a computer numeric controller (CNC)). The determination module 206 can be integrated with the cutting or welding system 204 to control the operation of the system 204 and the delivery device 202. For example, in addition to the functions described above, the determination module 206 can also perform substantially the same functions as the digital signal processor 160 of the torch system 90 of FIG. 1. Alternatively, the determination module 206 is a standalone device separate from the system 204 and can communicate with the system 204 via a wired or wireless connection. For example, the determination module 206 can reside external to the system 204. The determination module 206 can be server- and/or cloud-based (e.g., software as a service), and the system 204 can interact with the determination module 206 remotely to display or otherwise provide the recommendations for suitable components and/or operating parameters. In some embodiments, the power supply of the cutting or welding system 204, such as the power supply/gas supply 110 of the plasma arc torch system 90 of FIG. 1, can include the determination module 206 or interact with the determination module 206 remotely to display or otherwise provide the recommendations. In some embodiments, the determination module 206 resides in the computing device 208 such that the computing device 208 can decide which components and/or operating parameters are suitable to a particular operating process without connection to a local or remote system. In general, the determination module 206 can locate anywhere in the network 200, such as closer to the cutting or welding system 204 or the computing device 208 in a less connected environment or further away from these entities in a more distributed environment. In some embodiments, functions provided by the determination module 206 can be distributed among many different entities in the network 200, including the cutting or welding system 204, the computing device 208 and/or a remote location.

The computing device 208 refers to a device with a processor and memory that can execute instructions. The computing device 208 can be a mobile device that includes, but is not limited to, portable computers, laptop computers, personal digital assistants (PDAs), e-Readers, cellular telephones, e-mail clients, tablets and other mobile/portable devices. The computing device 208 can be integrated with a vending machine or a bin or shelf that stores various components. In some embodiments, the computing device 208 offers wireless connection to the determination module 206. In some embodiments, the computing device 208 includes a client application and a receiver 214 configured to receive data from the determination module 206 and verify whether a component is suitable for installation into the delivery device 202 in compliance with the data received from the determination module 206. In some embodiments, the determination module 206 is integrated with the computing device 208.

Specifically, the computing device 208 receives from the determination module 206 information that includes at least one of: i) the identification of one or more suitable components and/or ii) one or more operating requirements. The computing device 208 can also include a reader 216 for reading an element 220 associated with the component 212, where the element 220 provides indicia of at least one characteristic of the corresponding component 212. The computing device 208 can further include a processor 218 for approving the selected component 212 for assembly into the delivery device 202 if the indicia associated with the element 220 matches the identification(s) of the desired component(s) and/or satisfies the operating requirement(s) transmitted by the determination module 206.

In some embodiments, the element 220 is an electrically writable and/or readable device configured to transmit information about the component in the form of one or more signals. For example, the element 220 can be a tag, such as a radio-frequency identification (RFID) tag, a barcode tag, a laser-readable marking or any visual characteristic. In some embodiments, the element 220 is a detector (e.g., a sensor) for detecting a physical characteristic of the corresponding component 212 and transmitting the detected information in the form of one or more signals. The reader 216 can comprise a scanner or a camera for reading signals transmitted by the element 220, extracting data conveyed by the signals, and providing the extracted data to the processor 218 of the computing device 208 for analysis.

In some embodiments, an element 220 of a component 212 is encoded with information pertaining to the component 212. The encoded information can be identification information such as the component's name, trademark, manufacturer, serial number and/or type. Other encodable information can include metal composition of the component 212, weight of the component 212, date, time and/or location at which the component 212 was manufactured, personnel responsible for the component 212, and the like.

In some embodiments, information is encoded to an element 220 at the time of manufacture of the corresponding component 212. Information can also be encoded/updated to the element 220 during the lifetime of the component 212, such as after each component use in a cutting or welding operation. Such information can include the date, time, duration and location of component use, any abnormalities detected during use, component conditions after use and/or values of operating parameters during use. For example, the element 220 can encode a counter to track the number of starts performed by the component 212 and record the values of pertinent operating parameters (e.g., current and cut time for each start). Information encoded in the element 220 can be used to compute the life expectancy and/or remaining life in the component 212.

Information encoded to an element 220 can also define conditions suitable for operating the corresponding component 212, such as suitable values of parameters for operating the component 212. For example, if the component 212 is a shield, the corresponding element 220 can include data to indicate the type of shield gas and/or the appropriate gas flow rate for the shield. In some embodiments, encoded data of the element 220 provides information about other related components. For example, encoded data can identify other components that are compatible with the component 212, assisting with installation of the entire suite of components in a delivery device to achieve certain performance metrics. U.S. patent application Ser. Nos. 13/439,259, 13/560,059, and 13/838,919 describe various systems and methods for encoding and retrieving data associated with a torch component, which are incorporated by reference herein in their entireties.

The reader 216 of the computing device 208 is adapted to interrogate the element 220 to extract the encoded information and forward the information to the processor 218. The reader 216 can be sufficiently compact and lightweight to be integrally formed with the computing device 208 or attached to the computing device 208. In some embodiments, the element 220 is a barcode, in which case the reader 216 can be a camera for scanning the barcode and extract the encoded information. In some embodiments, the element 220 is an RFID tag, in which case the reader 216 can be a RFID reader for interrogating the RFID tag to obtain the encoded information.

Pertinent information extracted from the element 220 by the computing device 208 can include identification of the component 212 associated with the element 220, a type of the component 212, and/or data related to the computation of a life expectancy of the component 212. Based on the extracted information, the processor 218 of the computing device 208 can verify whether the component 212 is appropriate for configuration into a delivery device 202 of a cutting or welding system 204 by comparing, or causing another device to compare, the extracted component information with information received from the determination module 206 regarding the delivery device 202 and/or a desired operation. In some embodiments, if the identification of a scanned component 212 matches that of a suitable component transmitted by the determination module 206, the processor 218 is adapted to recommend the scanned component 212 to the user via, for example, a graphical interface or a printout. In some embodiments, if values of operating parameters of the scanned component 212 match the operation requirements transmitted by the determination module 206, the processor 218 is adapted to recommend the scanned component 212 to the user. In some embodiments, if the type of the scanned component 212 matches the desired component type transmitted by the determination module 206, the processor 218 is adapted to recommend the scanned component 212 to the user.

Figures 3, 4:
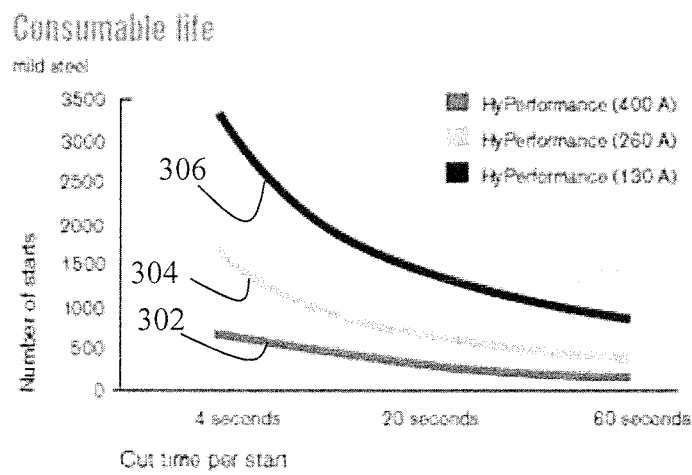
FIG. 3 shows various exemplary life expectancy plots of a component when operated at different current levels, durations and number of starts.
FIG. 4 shows an exemplary graphical interface of the computing device of FIG. 1.

In addition to performing matching based on identifications, types and/or operating requirements, the processor 218 can determine (or cause another device to determine) if the component 212 has sufficient usable life remaining to complete a desired operation of the delivery device 202 before recommending the component 212 to the user. Specifically, the processor 218 can obtain past usage information related of the component 212 and compute (or instruct another device to compute) the life expectancy of the component 212 with respect to a desired operation. For example, FIG. 3 shows various exemplary life expectancy plots of a component (e.g., a nozzle or an electrode of a plasma arc torch) when operated at different current levels, durations and number of starts. Specifically, curves 302, 304 and 306 show exemplary life expectancy trends for a component operated at 400 amps, 260 amps and 130 amps, respectively. Based on these curves, if a user wants to perform 300 cuts at 130 amps for a duration of 20 seconds per cut, and a scanned component 212 has already recorded performance of 1500 cuts at the same usage level, the processor 218 is unlikely to recommend the scanned component 212 to the user, since the scanned component 212 can handle at most about 100 more cuts at the desired current and cut duration according to the curve 306 of FIG. 3.

In general, the processor 218 of the computing device 208 can verify the suitability of a selected component 212 for installation into the delivery device 202 based on (1) comparing the data extracted from the element 220 of the selected component 212 and the data sent by the determination module 206 corresponding to a user desired operation, and (2) making a suitable recommendation to the user via one or more graphical user interfaces. In some embodiments, the computing device 208 performs both the comparing and recommendation functions. Alternatively, the processor 218 can forward the data extracted from the element 220 to another device, such as the determination module 206, where the determination module 206 performs the actual comparison. Thereafter, the determination module 206 can communicate to the computing device 208 regarding whether the selected component 212 is suitable for configuration into the delivery device 202. The computing device 208 is adapted to display the recommendation to the user.

The processor 218 can be a software-based module or include a combination of hardware or software. Even though FIG. 2 illustrates the processor 218 to be a part of the computing device 208, the processor 218 can be external to and remote from the computing device 208, such as integrated with the determination module 206 or at another remote location. The processor 218 can be server- and/or cloud-based (e.g., software as a service), and the computing device 208 can interact with the processor 218 remotely to display or otherwise provide information regarding component compatibility. In general, the processor 218 can locate anywhere in the network 200, such as closer to the computing device 208 in a less connected environment or further away in a more distributed environment. In some embodiments, functions provided by the processor 218 can be distributed among many different entities in the network 200, including the cutting or welding system 204, the computing device 208, the determination module 206, and/or a remote location.

Figure 5:
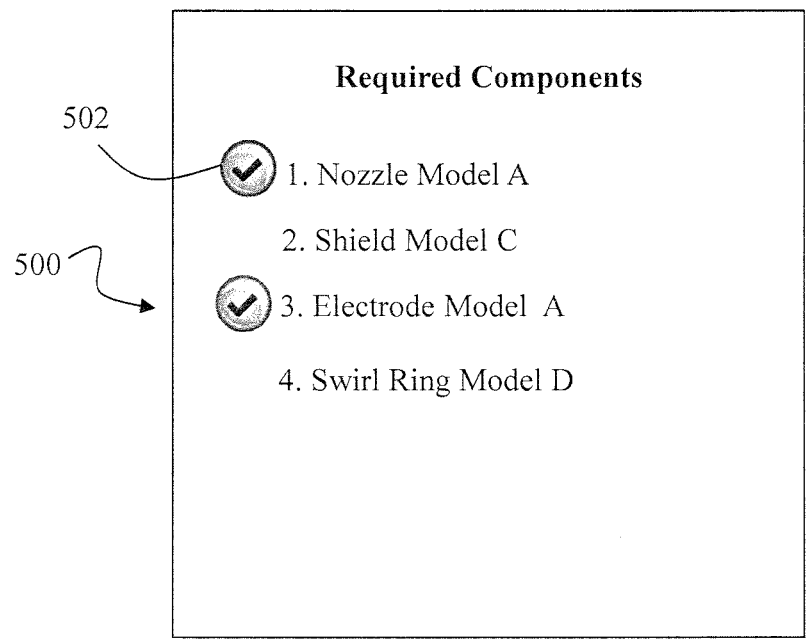
FIG. 5 shows another exemplary graphical interface of the computing device of FIG. 1.

In some embodiments, the computing device 208 includes one or more graphical interfaces for displaying at least one of i) information received from the determination module 206 regarding identification of one or more components and/or operation requirements of the delivery device 202 or ii) suitability of one or more scanned components for configuration into the delivery device 202 as a result of comparing data related to the scanned components and data received from the determination module 206 generated by the processor 218. FIG. 4 shows an exemplary graphical interface 400 of the computing device 208 for displaying a list of values of operating parameters that need to be satisfied by one or more selected components. As shown, each selected component needs to be able to cut mild steel at a process current level of 200 Amps and has sufficient life remaining to carry out this operation for 50 cuts with 25 seconds duration per cut. FIG. 5 shows another exemplary graphical interface 500 of the computing device 208 for displaying a list of one or more desired components usable to configure a delivery device based on a user-specified operation. As shown, the determination module 206 can identify multiple components for assembly into a delivery device. For example, if the delivery device is a plasma arc torch, the list of components required for configuring the torch to achieve a specific operation (such as the operation defined by the parameters of FIG. 4) can include identification of a specific electrode, nozzle, shield, and swirl ring. If a scanned component matches one of the identified components on the list, as determined by the processor 218, an indication 502 (e.g., a checkmark) can be used to indicate matching. Conversely, if the processor 218 determines that a scanned component does not match any of the identified components, a notification (not shown) can be suitably displayed on the graphical interface 500 to indicate mismatch. In some embodiments, the computing device 208 can present both of the graphical interfaces 400 and 500 to a user. Alternatively, the computing device 208 can present one of the two graphical interfaces 400 and 500.

Figure 6:
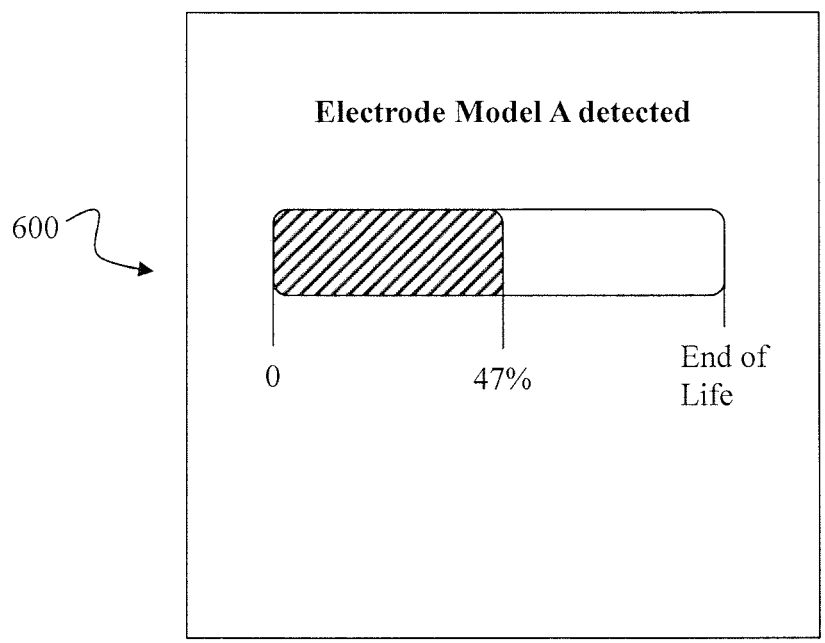
FIG. 6 shows yet another exemplary graphical interface of the computing device of FIG. 1.

The computing device 208 can be configured to present at least one graphical interface indicating the life expectancy a scanned component normalized with respect to a desired operation, as determined by the processor 218. FIG. 6 shows yet another exemplary graphical interface 600 of the computing device 208 for displaying a percentage of life remaining of a scanned electrode, assuming that the electrode is operated under the set of conditions specified by interface 400 of FIG. 4. As shown, the electrode has 53% life left to perform 50 consecutive cuts on a piece of mild steel at 200 Amps for a duration of 25 seconds per cut. Furthermore, if the processor 218 determines that the 53% life remaining is not sufficient to perform such an operation (e.g., using the life expectancy trends of FIG. 3), the computing device 208 can output a warning to the user.

Figure 7:
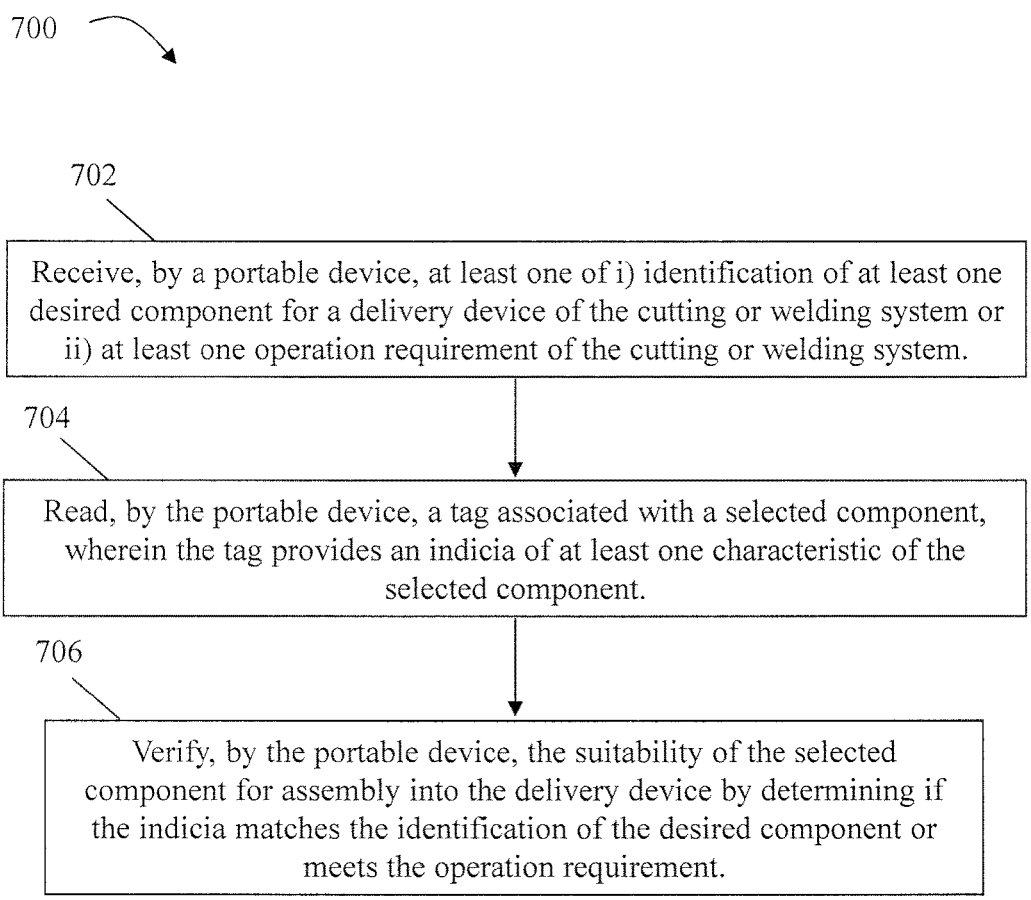
FIG. 7 shows an exemplary process illustrating a method of configuring the cutting or welding system of FIG. 1.

FIG. 7 shows an exemplary process 700 illustrating a method of configuring the cutting or welding system 204 of FIG. 1. At step 702, the computing device 208, which can be a mobile/portable device, receives at least one of i) identification of at least one desired component for installation into a delivery device 202 of the system 204 or ii) at least one operation requirement of the system 204. The identification and/or operation requirement information can be determined by the determination module 206 in response to a user input of a desire operation, such as user specification of the shape of at least one part to be cut from a workpiece. In addition, the determination module 206 can transmit the identification and/or operation requirement information to the computing device 208. At step 704, the computing device 208 can scan a selected component 212 by reading an element 220 (e.g., a tag) associated with the selected component 212. The element 220 is configured to provide indicia of at least one characteristic of the selected component 212. For example, the element 220 can be an RFID tag, in which case the computing device 208 can obtain information encoded on the RFID tag by scanning the tag with an RFID reader. Information encoded on the element 220 can include, for example, the identification of the selected component 212, the type of the selected component 212, and/or usage history associated with the selected component 212. Based on the encoded information, the processor 218 can verify, at step 706, the suitability of the selected component 212 for assembly into the delivery device 202 by determining (or cause another device to determine) if the indicia encoded in the element 220 matches the information transmitted by the determination module 206. Matching can be based on one or more criteria, including (i) the identification of the selected component 212 matches at least one of the identifications of desired components; (ii) the operation requirements of the selected component 212 meet the desired operation requirements; and/or (iii) there is sufficient life left in the selected component 212 to carry out the user-specified operation. In some embodiment, the matching process is handled by the processor 218, which can reside on the computing device 208, incorporated with the determination module 206, and/ or at a remote location. The computing device 208 is adapted to display the results of the comparison and make a suitable recommendation to the user.

Figure 8:
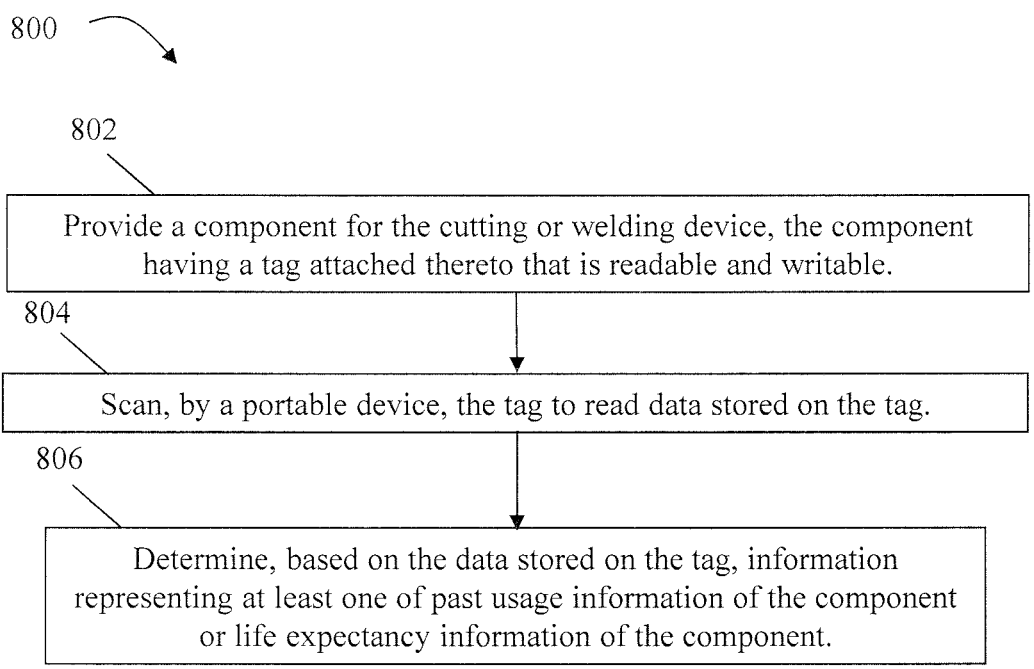
FIG. 8 shows another exemplary process illustrating a method of configuring the cutting or welding system of FIG. 1.

FIG. 8 shows another exemplary process 800 illustrating a method of configuring the cutting or welding system 204 of FIG. 1. At step 802, a component 212 is selected by a user with the potential of being installed into the cutting or welding device 202 of the system 204. The component 212 has an element 220 (e.g., a tag) attached thereto that is writable (i.e., capable of recording information about the component 212) and readable (e.g., capable of being read for the purpose of extracting the stored information). At step 804, a computing device 208 reads the element 220 of the component 212, such as using the reader 216, to extract data stored in the element 220. At step 806, the processor 218 determines, based on the data stored on the element 220, information representing at least one of past usage information of the component 212 or life expectancy information of the component 212. Such information can be used by the processor 218 to decide whether to recommend the component 212 for installation into the delivery device 202.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system (e.g., a cloud-computing system) that includes any combination of such back-end, middleware, or front-end components. The above described techniques can be implemented as a Software-As-A-Service (SaaS) model or using a multi-tiered approach.

Communication networks can include one or more packet-based networks and/or one or more circuit-based networks in any configuration. Packet-based networks can include, for example, an Ethernet-based network (e.g., traditional Ethernet as defined by the IEEE or Carrier Ethernet as defined by the Metro Ethernet Forum (MEF)), an ATM-based network, a carrier Internet Protocol (IP) network (LAN, WAN, or the like), a private IP network, an IP private branch exchange (IPBX), a wireless network (e.g., a Radio Access Network (RAN)), and/or other packet-based networks. Circuit-based networks can include, for example, the Public Switched Telephone Network (PSTN), a legacy private branch exchange (PBX), a wireless network (e.g., a RAN), and/or other circuit-based networks. Carrier Ethernet can be used to provide point-to-point connectivity (e.g., new circuits and TDM replacement), point-to-multipoint (e.g., IPTV and content delivery), and/or multipoint-to-multipoint (e.g., Enterprise VPNs and Metro LANs). Carrier Ethernet advantageously provides for a lower cost per megabit and more granular bandwidth options.

Devices of the computing system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer, mobile device) with a world wide web browser (e.g., Microsoft® Internet Explorer® available from Microsoft Corporation, Mozilla® Firefox available from Mozilla Corporation).

It should also be understood that various aspects and embodiments of the invention can be combined in various ways. Based on the teachings of this specification, a person of ordinary skill in the art can readily determine how to combine these various embodiments.

What is claimed is:

1. A system for configuring a delivery device of a cutting or welding apparatus, the system comprising:
   a determination module for determining at least one desired component of the delivery device or a value for at least one operating parameter of the cutting or welding apparatus;
   a mobile computing device comprising:
      a receiver for receiving information from the determination module including at least one of i) identification of the desired component or ii) the value of the operating parameter and (iii) a desired operation of the cutting or welding apparatus;
      a reader for reading an element associated with a selected component, wherein the element provides indicia of at least one characteristic of the selected component; and
      a processor for approving the selected component for assembly into the delivery device if the indicia matches the identification of the desired component or satisfies the value for the at least one operating parameter,
      wherein the mobile device is configured to present a percentage usage remaining for the selected component normalized with respect to the desired operation.

2. The system of claim 1, wherein the reader comprises at least one of a scanner or a camera.

3. The system of claim 1, wherein the tag comprises a radio-frequency identification (RFID) tag, a barcode, a laser-readable marking or a visual characteristic.

4. The system of claim 1, wherein the selected component comprises one of an electrode, a nozzle, a shield, a swirl ring, a retaining cap or a replaceable torch body of a plasma arc system.

5. The system of claim 1, wherein the selected component comprises a consumable component for a laser or waterjet cutting system.

6. The system of claim 1, wherein the indicia comprises at least one of an identification, a type, or a life expectancy of the selected component.

7. The system of claim 1, wherein
   the reader is configured to read a plurality of elements associated with a plurality of selected components, and
   the processor is configured to approve the plurality of selected components for assembly into the delivery device by determining if the plurality of selected components satisfy i) identification of a plurality of desired components corresponding to a cutting routine or ii) one or more operation requirements corresponding to the cutting routine.

8. A computer-implemented method for configuring a cutting or welding system, the method comprising:
   receiving, by a portable device, at least one of i) identification of at least one desired component for a delivery device of the cutting or welding system or ii) at least one operation requirement of the cutting or welding system, and (iii) a desired operation of the cutting or welding system;
   reading, by the portable device, a tag associated with a selected component, wherein the tag provides indicia of at least one characteristic of the selected component;
   verifying, by the portable device, the suitability of the selected component for assembly into the delivery device by determining if the indicia matches the identification of the desired component or meets the operation requirement; and
   presenting, by the portable device, a percentage usage remaining for the selected component normalized with respect to the desired operation.

9. The computer-implemented method of claim 8, further comprising:
   receiving, by a determination module, instruction code for operating the delivery device;
   identifying, by the determination module, the operation requirement and the desired component to implement the instruction code; and
   transmitting, by the determination module, to the portable device at least one of the identification of the desired component or the operation requirement.

10. The computer-implemented method of claim 9, wherein the determination module resides on the portable device.

11. The computer-implemented method of claim 9, wherein the determination module is remote from the portable device.

12. The computer-implemented method of claim 9, wherein the instruction code includes data for the shape of at least one part to be cut from a workpiece by the delivery device.

13. The computer-implemented method of claim 8, wherein the tag comprises a radio-frequency identification (RFID) tag, a bar code, a laser-readable marking, or a visual characteristic.

14. The computer-implemented method of claim 8, wherein the tag is readable, or writable, or a combination thereof.

15. The computer-implemented method of claim 8, wherein the indicia comprises at least one of an identification, a type, or a life expectancy of the selected component.

16. The computer-implemented method of claim 8, wherein the delivery device comprises a plasma arc torch, a waterjet nozzle, a waterjet orifice, a laser nozzle, or a cutting head.

17. The computer-implemented method of claim 8, wherein the selected component comprises a consumable component.

18. The computer-implemented method of claim 17, wherein the consumable component comprises one of an electrode, a nozzle, a shield, a swirl ring, a retaining cap or a replaceable torch body for a plasma arc system.

19. The computer-implemented method of claim 17, wherein the consumable component is associated with a laser or waterjet cutting system.

20. The computer implemented method of claim 8, further comprising recommending, by the portable device, a plurality of selected components for assembly into the delivery device corresponding to at least one of i) a plurality of identifications of desired components for the delivery device or ii) a plurality of operation requirements of the cutting or welding system.

21. The computer implemented method of claim 8, wherein the portable device comprises a mobile computing device.

22. A computer readable product, tangibly embodied on a non-transitory computer readable medium or a machine-readable storage device and operable on a digital signal processor for a system to configure a delivery device of a cutting or welding apparatus, the computer readable product including instructions operable to cause the digital signal processor to:
- receive, by the non-transitory computer readable medium or the machine-readable storage device, at least one of i) identification of at least one desired component for assembly into the delivery device or ii) at least one operation requirement of the cutting or welding apparatus, and (iii) a desired operation of the cutting or welding system;
- scan, by the non-transitory computer readable medium or the machine-readable storage device, a tag associated with a selected component, wherein the tag provides indicia of at least one characteristic of the selected component;
- verify, by the non-transitory computer readable medium or the machine-readable storage device, the suitability of the selected component for assembly into the delivery device based on comparing the indicia with at least one of the identification of the desired component or the operation requirement; and
- present, by the non-transitory computer readable medium or machine-readable storage device, a percentage usage remaining for the selected component normalized with respect to the desired operation.

23. The computer readable product of claim 22, wherein identification of the desired component or the operation requirement is determined by a determination module based on a cutting routine supplied by a user, the determination module being in electrical communication with the non-transitory computer readable medium or the machine-readable storage device.

24. The computer readable product of claim 22, further comprising verify, by the non-transitory computer readable medium or the machine-readable storage device, the suitability of a plurality of selected components for assembly into the delivery device corresponding to at least one of i) a plurality of identifications of desired components for the delivery device or ii) a plurality of operation requirements of the cutting or welding apparatus.

25. A computer-implemented method for configuring a cutting or welding device, the method comprising:
- providing a component for the cutting or welding device, the component having a tag attached thereto that is readable and writable;
- scanning, by a portable device, the tag to read data stored on the tag;
- determining, based on the data stored on the tag, life expectancy information of the component;
- confirming, based on the life expectancy information, that the component has sufficient usable life remaining to complete a desired operation of the cutting or welding device; and
- presenting, by the portable device, a percentage usage remaining for the component, wherein the percentage usage is normalized with respect to the desired operation.

26. The computer-implemented method of claim 25, further comprising recommending the component for assembly into the cutting or welding device to perform the desired operation if the component is confirmed to have sufficient usable life remaining.

27. The computer-implemented method of claim 26, further comprising writing data to the tag of the component to update the data stored on the tag after the component is used to perform the desired operation.

28. The computer-implemented method of claim 25, wherein the data stored on the tag records at least one of the number of starts performed by the component, the current amperage corresponding to each start, and the cut time corresponding to each start.

29. The computer-implemented method of claim 25, further comprising presenting the life expectancy information of the component via a graphical user interface of the portable device.

* * * * *